Figure 1:
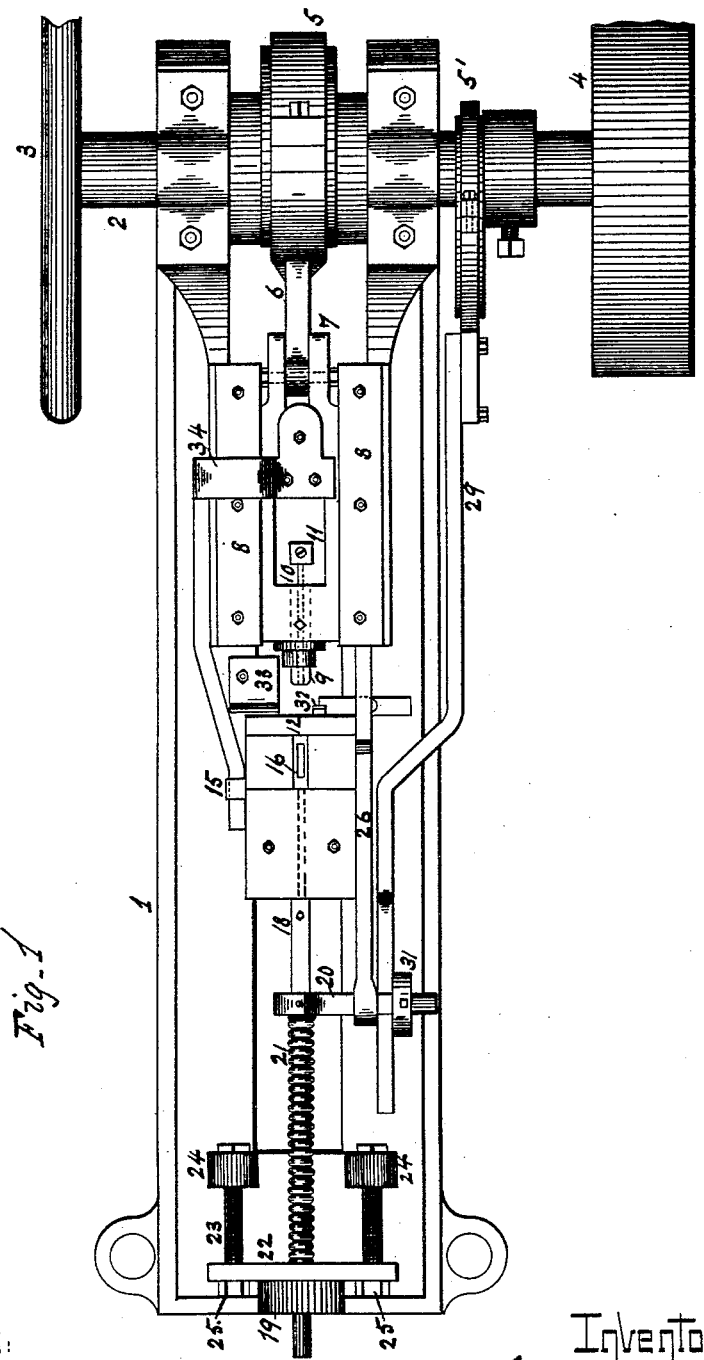

(No Model.) 4 Sheets—Sheet 1.

J. W. ELLS.
MACHINE FOR MAKING HOBNAILS.

No. 476,191. Patented May 31, 1892.

Witnesses:
Inventor.
Josiah W. Ells (No Model.) 4 Sheets—Sheet 2.
J. W. ELLS.
MACHINE FOR MAKING HOBNAILS.
No. 476,191. Patented May 31, 1892.
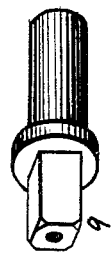
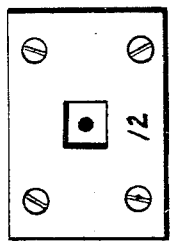
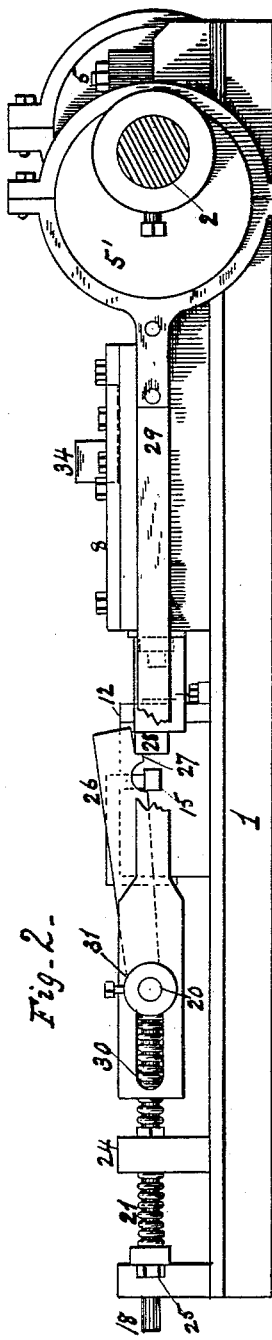
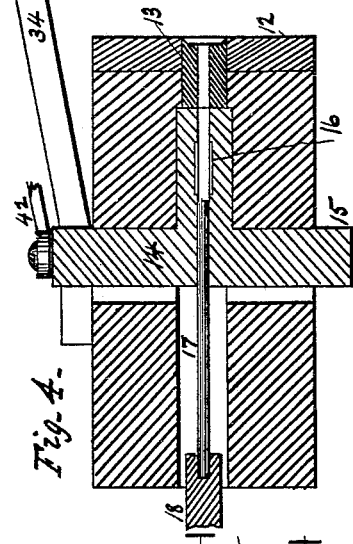
Witnesses:
Geo. H. Harvey
Alfred H. Jones
Inventor:
Josiah W. Ells (No Model.) 4 Sheets—Sheet 3.
J. W. ELLS.
MACHINE FOR MAKING HOBNAILS.
No. 476,191. Patented May 31, 1892.
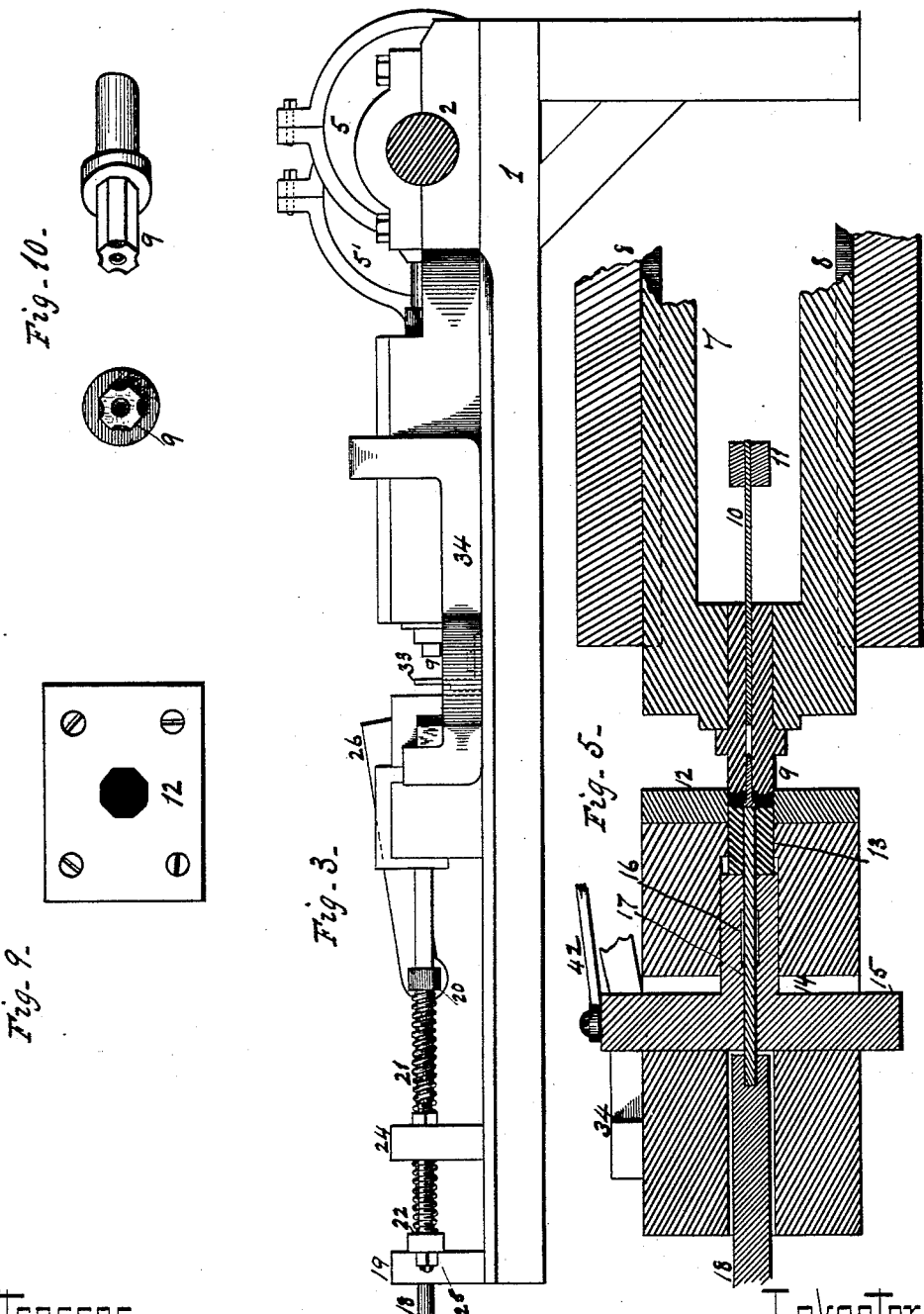
Witnesses:
Geo H Harvey
Alfred H Jones
Inventor:
Josiah W Ells (No Model.) 4 Sheets—Sheet 4.
J. W. ELLS.
MACHINE FOR MAKING HOBNAILS.
No. 476,191. Patented May 31, 1892.
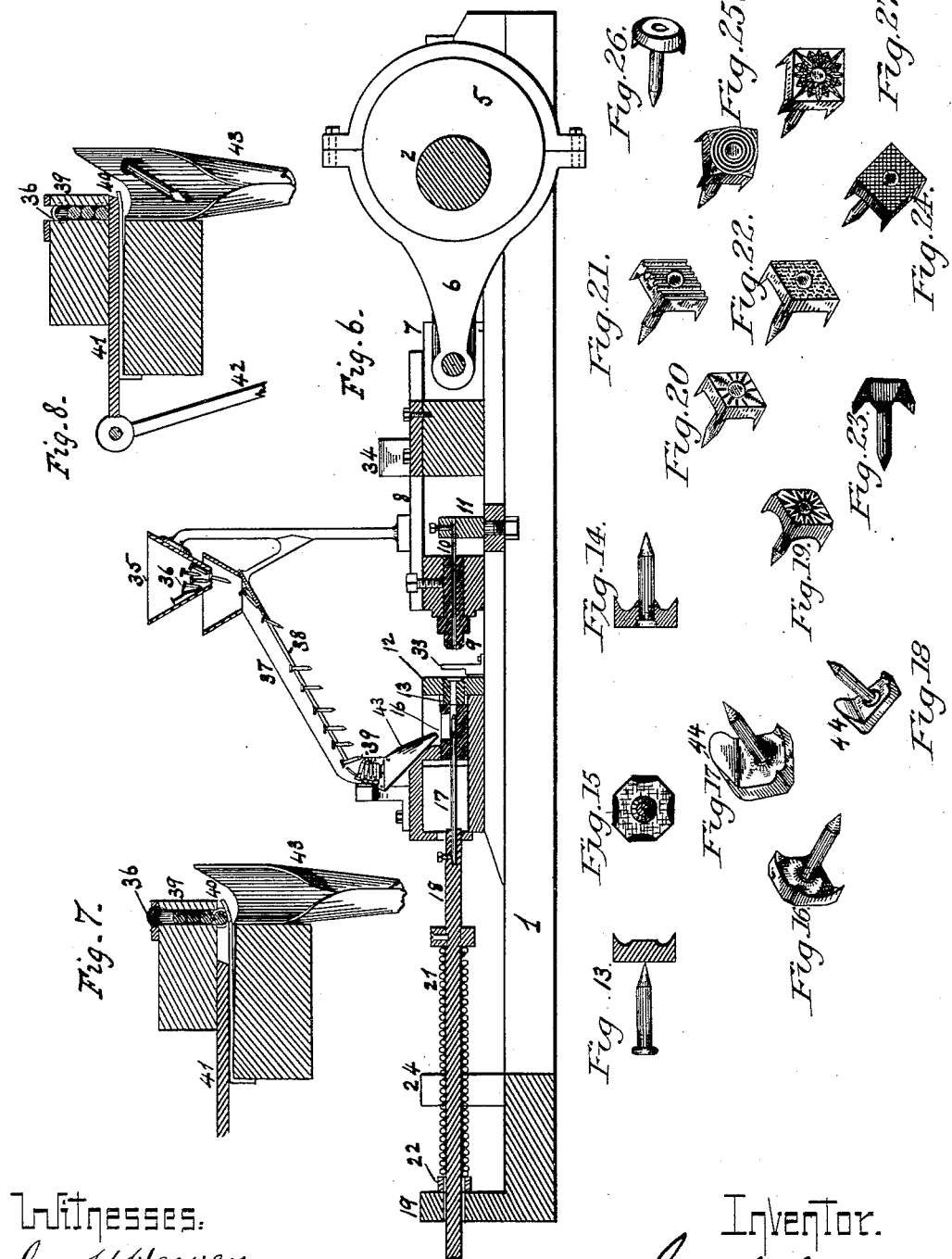
Witnesses:
Geo. H. Harvey
Alfred H. Jones
Inventor.
Josiah W. Ells

United States Patent Office.

JOSIAH W. ELLS, OF PITTSBURG, PENNSYLVANIA, ASSIGNOR TO OSCAR KLEBER, HARRY KLEBER, AND HENRY BRAUN, OF SAME PLACE.

MACHINE FOR MAKING HOBNAILS.

SPECIFICATION forming part of Letters Patent No. 476,191, dated May 31, 1892.

Application filed September 27, 1890. Renewed March 24, 1892. Serial No. 426,293. (No model.)

*To all whom it may concern:*

Be it known that I, JOSIAH W. ELLS, a citizen of the United States, residing at Pittsburg, county of Allegheny, and State of Pennsylvania, have invented a new and useful Improvement in Machines for Manufacturing Hobnails, of which the following is a full, clear, and exact description, reference being made to the accompanying drawings, forming part of this specification.

My present invention relates to the production of that class of nails commonly known to the trade as "hobnails," characterized by having a large protuberant head provided with an attenuated shank or stem. Heretofore such nails were made entirely by hand, no machine having been devised for that purpose, and it has long been the practice to form such nails by forging the same from an iron rod after the manner well known to blacksmiths. So tedious is the work and limited the production that nails of this character command a very high price, notwithstanding their roughness and irregular shape.

My present invention has for its object the production of hobnails in which the head and shank are composed of two different pieces of metal united to form a complete nail. This I accomplish by means of a machine that will sever from a heated bar of iron an imperforate blank of requisite size to constitute the intended nail-head and compress the same between properly-constructed dies to shape the head and at the same time drive or force a pointed wire through the head or blank and leave it there as a shank to the hobnail. The entrance of the pointed wire into the red-hot blank spreads and turns the fibers thereof, forcing the same a short distance outward beyond the original surface of the head, forming a collar or fillet immediately around the shank or wire, whereby it is given a deep and increased bearing in the head, which in cooling shrinks on the wire and holds it immovably fast. A nail thus produced possesses all the requisites of one made from a single piece of iron, with the additional advantage of having a more uniform head and a parallel nicked and pointed shank, which enables it to hold firmly in whatever it may be driven.

That others may fully understand the nature of my invention and the means whereby it is given practical form, I will proceed to describe the same by reference to the accompanying drawings, wherein—

Figure 1 represents a top view of a machine used in making my improved hobnail; Fig. 2, an elevation of that side of the machine nearest to the pulley to which the driving-belt is attached; Fig. 3, an elevation of that side of the machine farthest from its driving wheel or pulley; Fig. 4, an enlarged transverse longitudinal section of those parts comprising the central portion of the machine, showing the dies in an open position and ready to receive the hot blank; Fig. 5, a similar view of the same dies and portion of the machine when closed upon a blank having a nail forced therein; Fig. 6, a central longitudinal vertical section through the machine, together with a wire-nail-feeding device attached thereto; Fig. 7, an enlarged sectional view of so much of the nail-feeding device showing the nails therein preparatory to being pushed out one at a time; Fig. 8, a similar view of the same part, showing the position of the feeder upon pushing the nail out preparatory to its final delivery into the machine; Fig. 9, a face view of an octagonal box-die wherein the hot iron is received, compressed, and held while a nail is being driven through the same. Fig. 10 represents an end and perspective view of an octagonal punch made to fit and work in said octagonal die; Fig. 11, a front view of square die-box used in making square-head nails; Fig. 12, a perspective view of punch for use in said square die; Fig. 13, a blank-head with pointed wire-nail in position to pass through the same; Fig. 14, same blank with wire-nail driven through it a proper distance to form a hobnail; Fig. 15, a view of the under side of said hobnail; Fig. 16, a perspective view of under side of finished hobnail; Fig. 17, a perspective view of the under side of a hobnail provided along one edge of its head with a broad downwardly-projecting hook to extend over the edge of a boot or shoe sole, which form of nail is known to the trade as a "clamp-nail" or "clinker." Figs. 18, 19, 20, 21, 22, 23, 24, 25, 26, and 27 show a number of nails, each having a different shape or outer form of head.

To make hobnails in accordance with my invention, I prepare a machine consisting of a cast-iron frame 1, across one end of which is arranged in suitable bearings a strong shaft 2, fitted with an ordinary fly-wheel 3 and pulley 4 and near the middle portion with two eccentrics or cams 5 5' of unequal size and throw. Each cam is provided with a circumferential yoke. The one surrounding the smaller cam 5 is attached by means of a connecting-arm 6 to a carrier 7, so as to move it with a reciprocating rectilinear action in suitable guides 8. Within this carrier 7 is placed and firmly secured a detachable punch or male die 9, having a small round hole extending lengthwise and completely through the same, and arranged therein is a small steel rod 10, one end of which is secured and firmly held within a stationary post 11 by means of a suitable pinch-screw. This male die 9, being firmly held in the carrier 7, has a movement back and forth corresponding thereto, and which movement agrees with the size and character of the nail intended to be made. In the same horizontal plane and directly in front of the projecting outer end of the male die 9 is arranged and rigidly affixed to a solid portion of the machine by any suitable means a strong steel box or female die 12, the opening in which coincides with the size of the punch or male die 9, which is intended to enter and fit snugly therein on its forward movement. The base or rear end of the female die consists of a short steel block 13, having a short movement within the female die wherein it rests, and longitudinally through the center of this short block 13 is a round hole corresponding in size to the head of such wire nails as may be used in the formation of my improved hobnail. In the same horizontal plane, closely against and just back of the short block 13, is arranged in a suitable guideway a T-shaped bar of steel 14, the projecting arms 15 of which extend laterally a short distance outside of the guideway or bearing-block. This T-shaped bar has a short movement back and forth in the direction of the small block, and by pressing against the same forces the small block outward through the opening in the female die until the end of the small block is flush with the face of the female die, and no further. The action of the punch causes the block and T-shaped bar to move in a reverse direction when the punch enters the female die. Longitudinally and centrally through this T-shaped bar and in direct alignment with the rod 10 in the punch is a hole corresponding to that in the small block in the female die. Through the upper face of this T-shaped bar and extending downwardly into its central hole is a slot 16, fully as wide and a little longer than the wire nails used. Extending into the rear end of this longitudinal hole in the T-shaped bar is a strong steel rod 17 of a length sufficient to pass through the T-shaped bar and the short block within the female die, and no further. The outer end of this steel rod 17 is firmly secured in the approximate end of a much larger rod 18 by a pinch-screw or other suitable means. This larger rod extends back a considerable distance and through a substantial bearing 19 at that end of the machine most remote from its main shaft. This large rod is provided with a transversely-projecting arm 20, against which presses a powerful spiral spring 21, wound around said rod between said projecting arm and the bearing part of the machine through which the rod is made to slide endwise, and for the purpose of increasing or diminishing the tension of the spiral spring it is fitted with a cross-bar 22, through each end of which passes a suitable screw 23, held by proper supports 24 and moved up or down the rod by means of a nut 25 on the end of each said screws.

The transversely-projecting arm 20, permanently attached to the large rod 18, (around which the spring is wound,) carries a forwardly-projecting latch 26, pivoted to the arm in such a manner as to have a movement up and down within short range. Its free end is fitted with a short downward projection, so that when the spring and its carrying-rod are forced backward the latch will engage with a permanent stop 28 and temporarily lock said parts, holding the spring under compression as long as the latch remains down or thus engaged. The outer cam 5' on the main shaft, or that having the greater throw, has its yoke permanently connected to a long bar 29, somewhat bent or turned inward a short distance toward the machine and then straight in the direction of its length, where it is widened and provided with a longitudinal slot 30 of a length equal to a movement produced by its cam, and through this slot the projecting arm 20 of the spring-bar passes, the outer end of the arm being provided with a substantial collar 31, held and made adjustable thereon by means of a suitable pinch-screw. As the cam connected with this projecting arm, by means of a slotted bar 29, revolves, its action is such that when turning it will force the arm in a direction away from the cam, together with the rod 18, to which it is attached, and compress the spiral spring 21 thereon and enable the latch to engage with the fixed stop 28. The cam may then continue its revolutions, drawing its bar back and forth the entire length of the slot therein, leaving the spiral spring in a state of compression without further affecting it or the latch. On the same side of the machine and just in front of the box-die, but a little to one side of its central opening, is arranged and adjustably fixed to the bed of the machine an upwardly-projecting finger 32, constituting a stop. On the opposite side of the machine and adjustably fixed to the frame thereof is an upwardly-projecting guide 33, arranged, also, in front of the face of the box-die 12, its upper portion being separated therefrom a distance equal to the thickness of the iron bar intended to be used for making supplemental heads to the proposed hobnails, so that when the heated iron bar is inserted between the guide and the face of the box-die, then pushed forward, its heated end comes in contact with the upwardly-projecting finger 32 or stop on the opposite side of the die-box, and the advancing movement of the male die or punch 9 will sever a portion of said heated bar and carry the same forward into the die-box and by its action force the separated piece of hot iron against the short block 13, contained within the die-box, and drive it backward, thereby causing the T-shaped bar 14 to move in the same direction and to an extent equaling twice the thickness of the piece cut off and compressed. This action of the T-shaped bar will cause its projecting arms 15 to have a like movement, and that arm underneath the latch 26 will press against the inclined or curved surface underneath the latch at that end thereof and lift the same free from its engagement. The spring 21 upon being thus released will drive the rod 18 and its projecting arm 20, together with the smaller rod 17, within the T-shaped bar and nail in the pathway of its inner rod 17, its action being such as to drive the nail completely through the piece of hot iron held under compression within the dies, as shown in Fig. 14. At this instant the punch will recede or go back, and just before completing its backward stroke will, by means of a retractor 34, operating against the other projecting arm 15 of the T-shaped bar, draw it forward, and also the short block 13 within the die-box outward, to the extent of crowding out the nail so provided with an additional or supplemental head, and to prevent the nail from remaining in the punch the stationary rod 10 will expel said nail, which in being thus released will fall free therefrom through an opening in the base-plate of the machine and to the floor or into a receptacle placed to receive it.

As it is essential that the nails should be fed separately and one at a time into the slot 16 of the T-shaped bar and into the pathway of the nail-driver 17 preparatory to each forward action, I have provided the machine with a nail-feeding device, consisting of a small hopper 35, into which pointed and headed wire nails 36 may be promiscuously placed. Underneath this bottomless hopper is arranged a downwardly-inclined chute 37, having a slot 38 along its entire bottom of sufficient width to enable the body of the nails to fall readily through, and in this slot the nails will arrange themselves by the agitation of the machine-point downward one after the other, each hanging by its head, which prevents them from falling completely through the slot and serves to carry, guide, and deliver the nails downward with their points all in one direction into a narrow box 39, just sufficiently wide to admit of the nails resting lengthwise one on top of the other. The lowermost nails of the series are supported and kept up in the little box by means of a flat underlying spring 40. Above this spring is arranged a flat plate 41 the width and thickness of a nail. This plate is made to move forward, compress the spring, and by its further action force the lowermost nail outward into a short inclined chute 43, as shown in Fig. 8, placed in a suitable position to receive it, and down this chute 43 the nail slides point foremost and is delivered into the slot 16 of the T-shaped bar and into the pathway of the nail-driver at each severance and compression of a blank nail-head as made from the heated bar. After the lowermost nail has been forced out the plate 41 recedes a distance sufficiently far to enable another nail to drop on the spring 40, ready to be forced out by a repeated action of the plate in the manner just described. This plate obtains its action by means of a link or suitable connection 42 with the T-shaped bar and in such a manner as that when the T-shaped bar is drawn forward by the retractor 34 to discharge the newly-made nail from the die-box a wire nail immediately is deposited in the pathway of the nail-driver, so as to fall in front of it, when the nail-driver is forced back to be again released and thrown forward by the action of the spring and drive the nail through the heated piece of iron while compressed in the die-box in the manner heretofore set forth, which operations are intended and made to succeed each other rapidly and with great precision.

The opening in the die-box herein shown is represented as being square or quadrangular and the punch is also of a shape corresponding thereto; but it is obvious that the same may be octagonal, round, or any other shape deemed better or more desirable. By a reference to the drawings of the several completed hobnails from 13 to 27, inclusive, it will be seen that in general outline the heads are mostly angular and each having a different configuration upon the top or outer surface. It will also be seen by reference to these figures that the head of the wire nails, together with the transverse nicks in the shanks, are embedded in the supplemental head, which in shrinking thereon becomes immovably united one to the other. It will also be observed that each nail is provided with a fillet or projecting collar extending outwardly along the shank a distance increasing the original thickness of the iron blank from which the supplemental nail-head was produced. The corners of each nail-head are also provided with downwardly-projecting spurs or sharp angular points for the purpose of preventing a turning of the head when the nail is driven into any suitable material.

This machine is also adapted and constructed to produce nails having a supplemental head with spurs and fillet, as aforesaid, and in addition thereto a long downward projection or broad clamp or hook 44 along one side thereof, which is intended to overlap and secure the edges of such boots and shoes as require a use of the same. These several nails, in addition to the supplemental head, have a parallel-sided cylindrical shank pointed at that end most remote from the head, and the shank may be corrugated, wrinkled, or roughened from the fillet to the taper of the point, if desirable.

The several parts of this machine having been properly adjusted and set in motion, the operation of making hobnails thereby is as follows: A quantity of pointed wire nails of suitable size are placed promiscuously in the hopper 35, whereupon some of them will drop directly in the basin beneath and by agitation of the machine they will pass down into the inclined chute 37, their bodies falling through the slot therein, leaving them supported by their heads, whereby all become arranged in the same position, and as they slide down are deposited in the narrow channel or little box 39, from which they are eventually pushed out and dropped one by one in front of the reciprocating rod or nail-driver 17. A bar of iron of proper length, breadth, and thickness, having a considerable portion of one end thereof red-hot, is then inserted between the guide 33 and the face of the female die until the end of the bar comes against the stop 32 on the opposite side of the machine. As the reciprocating male die 9 moves forward it will sever a blank portion from the red-hot bar and carry it into the stationary die-box, at the same time bending or turning down the corners or other portion of the blank in such a manner as to form along at each side or angle thereof a short-pointed spur. The severance of the blank from the heated bar and the carrying of it by the punch into the die-box increases the length of the punch to the extent of the thickness of the bar, and this increased length operates to force the small block behind the blank farther away from the punch and in turn push the cross-bar in the same direction an equal distance. This extra movement of the cross-bar is what causes it to lift the latch and release the spring to send forward the nail-driver with a powerful blow. Without the intervention of this blank cut from the red-hot bar of metal the cross-arms will not be moved far enough back to lift the latch or operate the feeding device. Consequently no nails will be fed into the machine until a piece of red-hot iron has been properly inserted, cut off, and forced into the die-box, thus avoiding any loss of nails that would otherwise take place while the machine is in motion and the iron for forming the supplemental heads on them is not being fed in. The construction of the machine is such as to enable me to make hobnails having supplemental heads firmly fixed thereon and of any shape, size, or configuration cheaply and without loss or waste of material.

Having thus declared my invention and the mechanism whereby I give it bodily form, I claim—

1. In a machine for making hobnails of the character described, the combination of a box-die and suitable punch for severing a blank portion from a hot bar of metal, an intermittent nail-feeder, a longitudinally-acting nail-driver for forcing a nail centrally through said blank, a suitable spring for giving a percussive forward impetus to the nail-driver, a cam for compressing said spring and forcing the nail-driver back, a latch for holding the spring temporarily under compression, and a sliding block adapted to retreat within the box-die a distance equal to the movement of the punch therein without releasing the nail-driver or operating the nail-feeder.

2. In a hobnail-machine, the combination of a box-die and punch to operate therein, an automatically-acting nail-feeder, a longitudinally-acting nail-driver, a suitable spring for forcing said driver, a revolving cam for compressing said spring, a latch for temporarily retaining the spring under compression, a sliding block within the box-die, a passage-way for the nails into and through said sliding block, and a retractor-bar connecting the punch-carrier to said sliding block to draw it forward and expel the supplemental-headed nails from the die-box by a recession of the punch.

3. In a hobnail-machine, the combination of a punch and die-box, a sliding block provided with a nail-receiver at the back of and extending into and through said die-box, an automatically-acting nail-feeder, and a nail-driver that shall operate only through the interposition of a metallic blank pressed into the box-die and against the sliding block by the punch.

JOSIAH W. ELLS.

Witnesses:
ALFRED H. JONES,
WM. METCHEN.